United States Patent
Schweitzer et al.

(10) Patent No.: US 10,285,325 B2
(45) Date of Patent: May 14, 2019

(54) SEEDING APPARATUS AND METHOD OF DETERMINING A SEED SPACING VARIABILITY VALUE

(75) Inventors: John M. Schweitzer, Geneseo, IL (US); Jason D. Walter, Davenport, IA (US); James R. Peterson, Annawan, IL (US)

(73) Assignee: DEERE & COMPANY, Moline, IL (US)

( * ) Notice: Subject to any disclaimer, the term of this patent is extended or adjusted under 35 U.S.C. 154(b) by 138 days.

(21) Appl. No.: 12/940,618

(22) Filed: Nov. 5, 2010

(65) Prior Publication Data

US 2012/0004768 A1 Jan. 5, 2012

Related U.S. Application Data

(60) Provisional application No. 61/361,156, filed on Jul. 2, 2010.

(51) Int. Cl.
| | |
|---|---|
| *G06F 17/00* | (2006.01) |
| *G06F 19/00* | (2018.01) |
| *A01C 7/00* | (2006.01) |
| *A01C 7/10* | (2006.01) |
| *A01B 79/00* | (2006.01) |

(52) U.S. Cl.
CPC ............ *A01C 7/105* (2013.01); *A01B 79/005* (2013.01)

(58) Field of Classification Search
CPC .............................. A01C 7/105; A01B 79/005
USPC ..................................... 700/231–244; 701/50
See application file for complete search history.

(56) References Cited

U.S. PATENT DOCUMENTS

| | | | | |
|---|---|---|---|---|
| 4,085,862 | A * | 4/1978 | Steffen | .............................. 221/8 |
| 4,225,930 | A | 9/1980 | Steffen | |
| 4,277,833 | A * | 7/1981 | Steffen | ......................... 702/128 |
| 5,323,721 | A * | 6/1994 | Tofte | ..................... A01C 7/102 |
| | | | | 111/200 |
| 5,771,169 | A * | 6/1998 | Wendte | ............................ 702/5 |
| 6,070,539 | A | 6/2000 | Flamme et al. | |
| 6,386,128 | B1 * | 5/2002 | Svoboda | .............. A01B 79/005 |
| | | | | 111/200 |
| 6,505,146 | B1 * | 1/2003 | Blackmer | ...................... 702/189 |
| 6,941,225 | B2 * | 9/2005 | Upadhyaya et al. | ......... 701/470 |

(Continued)

FOREIGN PATENT DOCUMENTS

| | | |
|---|---|---|
| EP | 2047735 | 4/2009 |
| WO | 99/16004 | 4/1999 |

(Continued)

OTHER PUBLICATIONS

European Search Report dated Oct. 24, 2011 (7 pages).
EP11170985.3 European Examination Report dated Jan. 4, 2018 (6 pages).

*Primary Examiner* — Michael Collins
(74) *Attorney, Agent, or Firm* — Michael Best & Friedrich LLP

(57) ABSTRACT

A seeding apparatus and a method is disclosed in which a seed spacing variability value is determined and displayed to the operator during a planting operation. Any method of determining variability among a set of data can be used to determine the seed spacing variability value. Three examples are shown: standard deviation; coefficient of variation; and coefficient of uniformity. Data can be stored for later comparison with harvest yield data to determine the effects of seed spacing on yield.

16 Claims, 4 Drawing Sheets

(56) References Cited

U.S. PATENT DOCUMENTS

| | | | |
|---|---|---|---|
| 7,086,269 B2 * | 8/2006 | Sauder et al. | 73/1.01 |
| 7,448,334 B2 | 11/2008 | Mariman et al. | |
| 7,472,660 B2 | 1/2009 | Mariman et al. | |
| 7,487,732 B2 | 2/2009 | Johnston et al. | |
| 7,581,503 B2 | 9/2009 | Martin et al. | |
| 7,717,048 B2 | 5/2010 | Peterson, Jr. et al. | |
| 7,726,251 B1 | 6/2010 | Peterson et al. | |
| 8,078,367 B2 * | 12/2011 | Sauder | A01B 79/005 111/200 |
| 2006/0282467 A1 * | 12/2006 | Peterson | G06Q 50/02 |
| 2010/0010667 A1 * | 1/2010 | Sauder et al. | 700/231 |
| 2010/0257621 A1 * | 10/2010 | Ketkar | A01H 1/00 800/260 |
| 2012/0004768 A1 * | 1/2012 | Schweitzer et al. | 700/231 |

FOREIGN PATENT DOCUMENTS

| | | |
|---|---|---|
| WO | 9916004 | 4/1999 |
| WO | 2008/086318 | 7/2008 |

* cited by examiner

SEEDING APPARATUS AND METHOD OF DETERMINING A SEED SPACING VARIABILITY VALUE

CROSS REFERENCE TO RELATED APPLICATIONS

This application claims priority from provisional application No. 61/361,156, filed 2 Jul. 2010.

DETAILED DESCRIPTION

Agronomic research has indicated the importance of proper seed spacing for optimal yields in certain crops such as corn. However, producers, i.e. farmers, have not had a method of accurately determining seed spacing while planting, when there is an opportunity to take corrective action if there are any performance issues. Rather, producers had to wait until the plants emerged and then evaluate planter performance in terms of seed spacing. At best the producer could learn from the current crop to make improvements in planting the next year.

Figure 1:
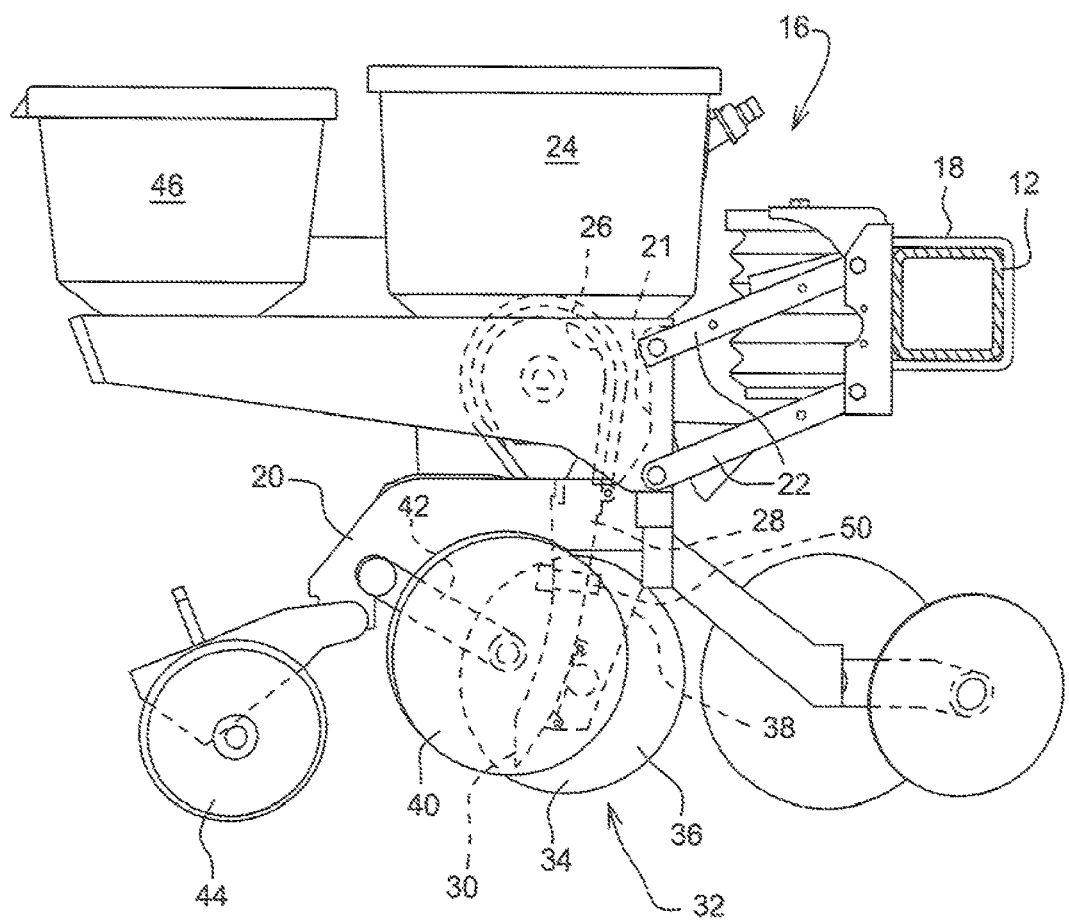
FIG. 1 is a side view of a planter and row unit.

With reference to FIG. 1, a seeding apparatus in the form of a planter 10 is shown. Planter 10 includes a tool bar 12 as part of a planter frame. Mounted to the tool bar at spaced locations along the tool bar are multiple planting row units 16, only one of which is shown. The row unit 16 is mounted to the tool bar 12 by U-bolts 18. The row unit 16 is provided with a frame member 20 having a pair of upwardly extending arms 21 at the forward end thereof. The arms 21 connect to a parallel linkage 22 for connecting the row unit 16 to the tool bar 12 for up and down relative movement therebetween in a known manner. Seed is stored in seed hopper 24 and provided to seed meter 26. The seed meter singulates seed from the hopper and sequentially discharges seeds. From the seed meter 26, the seed is dropped through a seed tube 28. The lower end 30 of the seed tube is positioned just above a seed trench formed in the soil by a trench opener 32. The trench opener 32 consists of a pair of disks 34 that are mounted on axes inclined to one another such that the disks 34 meet at a point 36 at the lower front portion of the disks. The disks 34 are mounted to a downwardly extending arm 38 of the row unit frame member 20. The seed tube 28 is disposed immediately behind the arm 38, between the two disks 34 of the trench opener. Gauge wheels 40 are positioned one on each of the outer sides of the opener disks 34 and are positioned slightly rearward of the disks 34. The gauge wheels 40 are mounted to the row unit frame by arms 42 pivotally connected to the frame member 20. A gauge wheel adjustment mechanism (not shown) enables of the vertical position of the gauge wheels 40 to be adjusted relative to the opener disks 34. This establishes the depth to which the openers are inserted into the soil, i.e. the depth of the seed trench.

Seed drops through the open lower end 30 of the seed tube into the trench formed by the opener 32. A pair of closing wheels 44 are mounted to the frame member 20 rearward of the gauge wheels 40. The closing wheels 44 are also mounted on axes inclined to one another. The closing wheels push on the side walls of the seed trench to a close the trench over the seed therein. A chemical or fertilizer hopper 46 may also be provided on the row unit. The large seed hopper 24 may be replaced with a mini-hopper mounted to the seed meter and supplied with seed by a central seed delivery system. The row unit 16 is only shown to illustrate the planter, the particular structure of the row unit and meter can vary. Any of several types of structures can be used.

A seed sensor 50 is mounted to the seed tube 28. In response to seeds passing the sensor, the sensor generates a seed signal. A seed monitor 60 is provided at the operator station, typically in a towing vehicle, such as a tractor. The monitor 60 includes a visual display 62. A monitor 60 has a housing 61 that also contains a processor 63 and memory 65 therein, shown as being beneath the display 62. The seed sensor 50 is operably coupled to the monitor 60 either by an electrical wire, fiber-optic cable, wireless communication device, etc. to communicate the generated seed signals from the sensor 50 to the monitor 60. Sensor 50 can be located anywhere downstream of the seed meter to sense passing seed.

The processor is configured or programmed to process the seed signals to determine therefrom a seed spacing variability value. One way to do so is to use the time interval between seed signals. To do this, the seed monitor records the time between each seed signal for each row of the planter equipped with a sensor. The time interval between each seed signal is then calculated. The seed monitor determines the seed spacing variability value for each sample period, such as one second. Sample periods of other lengths can also be used. The seed monitor counts the number of seed signals in each one second period and records the time interval between each seed signal. The number of seed signals and the time between each signal together with the planter travel speed are then used to determine the seed spacing variability value (SSVV). The seed spacing variability value can also be determined using seed location data versus time intervals. In this case, the location of the row unit is recorded for each seed signal. The distance between adjacent seeds is then determined by comparing the locations of the adjacent seeds. The spacing, or distance, between seeds in the sample period is then used to determine the SSVV. The location of the row unit for each seed signal is determined from a localizing system such as GPS, the use of which is well know in agricultural applications.

Three different example seed spacing variability value calculations are described below. It is possible to calculate other values which are within the meaning of the claimed "seed spacing variability value." The three seed spacing variability values described below include: 1) the standard deviation; 2) the coefficient of variation (CV); and 3) the coefficient of uniformity (CU). The monitor may also receive a speed signal for the speed of the planter during the sample period and convert the time interval into seed spacing distance if desired.

A sample set of seed signal data is provided and used in all three calculations below of a seed spacing variability value. A population rate of 34,848 seeds per acre with 30 inch row spacing produces a desired seed spacing of six inches. The following table shows a series of seed signals, the time between signals and a calculated seed spacing distance based on the time and the planter speed input, in this example, five miles per hour. At the given speed and seed spacing, the 15 seed signals below is the number of seeds signals in one second sample period.

| Seed Signal | Time (sec) | Spacing (inches) |
| --- | --- | --- |
| 1 | | |
| 2 | 0.0455 | 4.0 |
| 3 | 0.0909 | 8.0 |
| 4 | 0.0515 | 4.5 |
| 5 | 0.0725 | 6.4 |
| 6 | 0.0805 | 7.1 |
| 7 | 0.0765 | 6.7 |
| 8 | 0.0495 | 4.4 |
| 9 | 0.0841 | 7.4 |
| 10 | 0.0555 | 4.9 |
| 11 | 0.0848 | 7.5 |
| 12 | 0.0455 | 4.0 |
| 13 | 0.0901 | 7.9 |
| 14 | 0.0485 | 4.3 |
| 15 | 0.0798 | 7.0 |

Seed Spacing Variability Value—Method 1

The seed spacing variability value (SSVV) when using the standard deviation is:

SSVV=SD where SD is the normal statistical calculation for standard deviation, which is:

$$SD = \sqrt{\frac{\sum (X-M)^2}{n-1}}$$

where Σ=sum of
X=individual values
M=mean of the individual values
n=sample size Using the sample data above with the time between seed signals:

SSVV=SD=0.0178 sec.

Using the spacing data:

SSVV=SD=1.56 inches

Seed Spacing Variability Value—Method 2

The seed spacing variability value, SSVV, using the coefficient of variation (CV) is:

SSVV=CV=SD/M where SD=standard deviation as calculated above
M=mean of the individual values This is a dimensionless number, and thus is the same for the time data and the spacing data. With the above data:

SSVV=CV=0.2604

Seed Spacing Variability Value—Method 3.

The seed spacing variability value, SSVV, using the coefficient of uniformity (CU) is:

$$SSVV = CU = \frac{\sum |X-M|}{nM}$$

where X=the individual values
M=the mean if the individual values
n=the sample size With the above data, the CU=0.237. Again, since this is a dimensionless value, the CU is the same with both the time interval data and the seed spacing data.

The seed spacing variability value when using the CV or CU can be expressed as:

SSVV=1−CV

Or

SSVV=1−CU

This may be a more natural value for the operator with 1 being the optimum in terms of no variation in seed spacing. Alternatively, the SSVV can be expressed as a percentage by:

SSVV=100(1−CV)

or

SSVV=100(1−CU)

with 100% being the optimum with no variation.

When using the CV or the CU, the same degree of variability in seed spacing, in terms of how far the seeds are from the desired location, will produce the same SSVV regardless of the seed population, i.e. the desired spacing. Thus, an operator can compare planter performance from field to field where the populations differ. With standard deviation however, the same variation will produce a different standard deviation for different populations. This makes it harder to compare between different fields. However, the studies conducted to determine the effect of seed spacing variability on yield, generally use the standard deviation since within each study, the population is typically the same for all test plots. As a result, an operator may prefer to use the standard deviation for the SSVV so the SSVV can be compared to test data.

Figure 2:
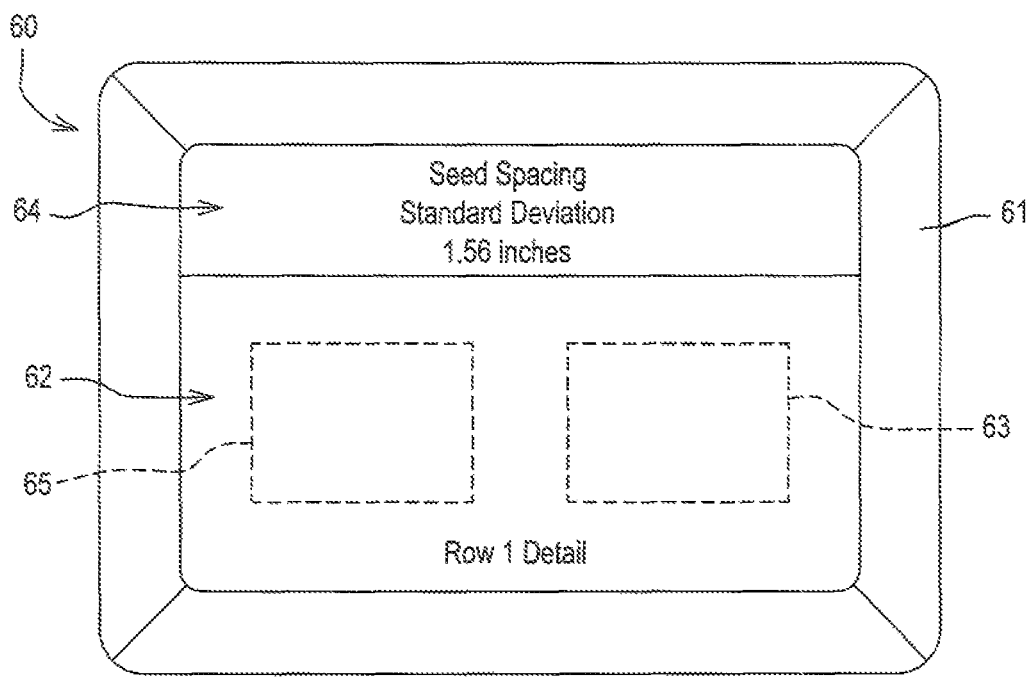
FIG. 2 is a plan view of a seed monitor housing and visual display illustrating a row unit seed spacing information.
Figure 3:
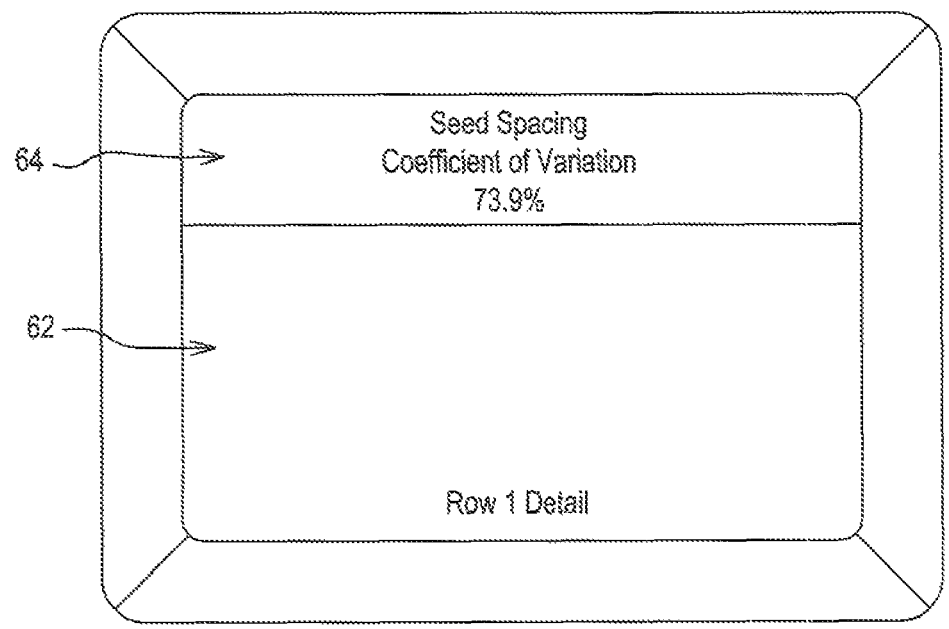
FIG. 3 is a plan view like FIG. 2 of a seed monitor housing and visual display illustrating alternative row unit seed spacing information.
Figure 4:
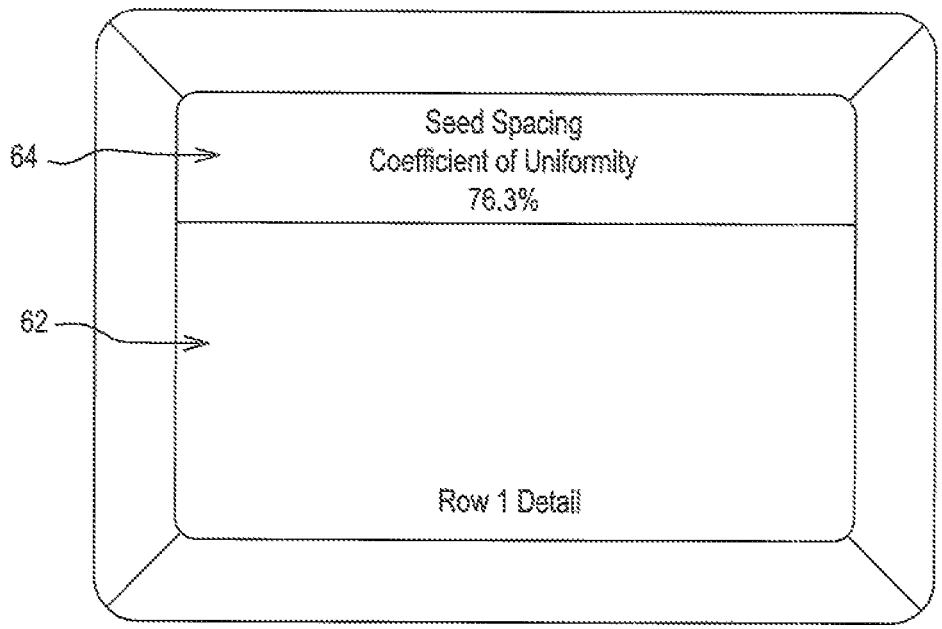
FIG. 4 is a plan view like FIGS. 2 and 3 of a seed monitor housing and visual display illustrating yet another alternative row unit seed spacing information.

Once calculated, the seed spacing variability value, SSVV, is displayed to the operator in real time, that is, during the planting operation, as the seed spacing variability values are calculated. The SSVV display could be refreshed each sample period. Alternatively, the display could be refreshed less often with the most recent SSVV being displayed each time it is refreshed. As another alternative, the seed spacing variability values could be averaged over a larger time period than one sample period, for example, ten seconds, or ten sample periods, and the average number displayed. This would avoid refreshing the display too often for the operator to make sense of the constantly changing data. With reference to FIG. 2, a sample display of the seed spacing variability is shown. On the visual display 62, a seed spacing window 64 is shown providing the seed spacing variability value as the standard deviation in inches. This sample is for a particular row identified as row 1. The standard deviation could also be provided in time. FIG. 3 shows the row 1 detail in which the seed spacing variability value is expressed in terms of the CV. FIG. 4 shows the row 1 detail in which the seed spacing variability value is expressed in terms of the CU.

Figure 5:
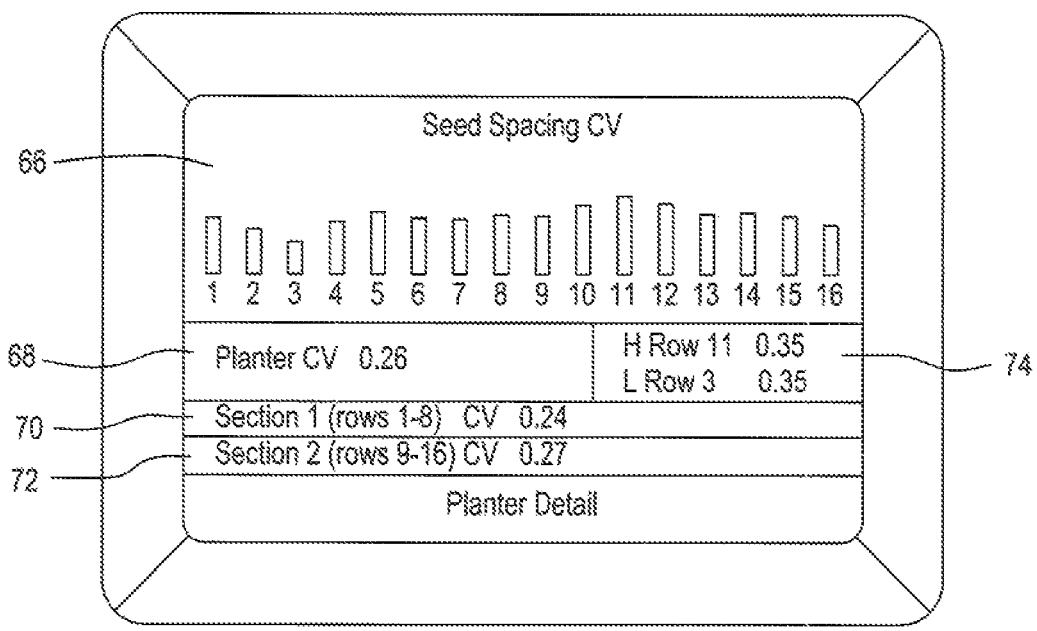
FIG. 5 is a plan view of the seed monitor housing and visual display illustrating planter and sectional seed spacing information.
Figure 6:
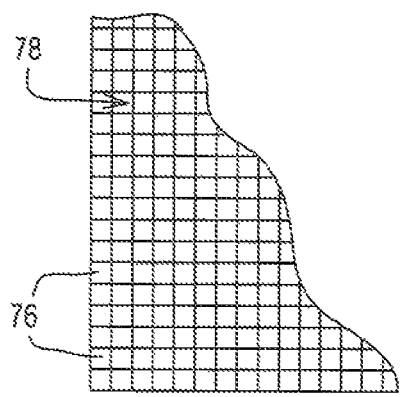
FIG. 6 is a portion of a field map of seed spacing information.
Figure 7:
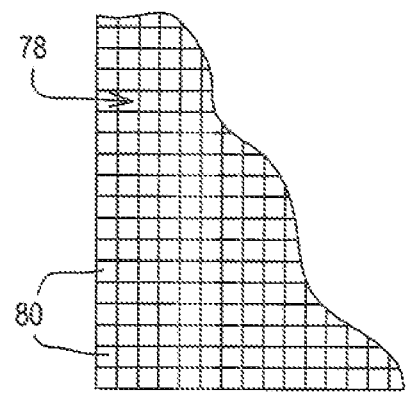
FIG. 7 is a portion of a field map of harvest yield information.

In FIG. 5, a planter detail screen is shown in which the SSVV is provided for each row of a 16 row planter. An upper window 66 displays a bar chart showing the SSVV for each row of the planter. The window 68 provides a planter composite seed spacing variability value for the entire planter in terms of CV. The planter composite seed spacing variability value can be determined one of two ways. One way is to average the seed spacing variability values of each row. The other way is to calculate a seed spacing variability value by using the seed signals from all rows during the sample period.

Windows 70 and 72 provide a section composite seed spacing variability value for a section of the planter. Section 1 represents rows 1-8 of the planter and shows the section composite seed spacing variability value for those rows. Window 72 shows section 2 of the planter, comprising rows 9-16. The section composite seed spacing variability values can be calculated in the same way as the planter composite seed spacing variability value, by calculating an average the seed spacing variability values for the selected rows or by using the seed signal data from the selected rows to calculate the composite values.

Window 74 provides a high and low row seed spacing variability value. By knowing which row unit has the worst seed spacing performance, the operator can identify possible performance issues with that row and take corrective action. Other information (not shown) provided on the display can help the operator diagnose the problem and determine the proper corrective action.

The seed spacing variability values for each sample period are stored in the seed monitor 60 memory 65. Location data for the apparatus is also collected. This can be most easily done by global positioning system (GPS) georeference position data. However, other types of location data can be collected such as but not limited to, an in field localization that determines relative location of the planter for each seed signal relative to point in the field versus a global location. The location data for each sample period is stored in the memory 65 and is associated with the SSVV for that sample period. The SSVV data and the location data are later used to generate a planting field map of the seed spacing variability values for the field. Each sample period represents one pixel 76 of the field 78 shown in FIG. 5. The pixel represents of the width of the total planter or the width of each section of the planter by the length of the field traveled therein in the sample time. In the example above, the sample period is one second, which at 5 miles an hour, is approximately 7.3 feet. A similar map of the field of 78 is produced during harvest of the subsequent crop showing the yield for each pixel 80 of the field. Crop yield data is stored in a memory during harvest for use in creating a harvest field map of the yield data. The size of each pixel 80 of the harvest data will be determined by the data collection rate of the harvester. By analyzing, i.e. comparing, the planting field map and the harvest field map, either manually or by a computer with appropriate software, the producer can begin to correlate seed spacing variability with yield. Over time, the producer can determine what level of seed spacing variability is acceptable or achievable. Furthermore, the producer has the data to make decisions about changes in the planting operation knowing how those will affect seed spacing variability and thus the yield. Pixels 76 of the SSVV data can be combined to better match the pixels 80 of the yield data. Conversely, if needed, the pixels 80 of the yield data can be combined to better match the planter SSVV data. The rows selected to provide sectional data are chosen to form sections that match the width of the harvester so that pixel width of the planter SSVV data matches pixel width of the harvester data. The planting field map could be based on the row unit seed spacing variability values, the section composite seed spacing variability values, or the planter composite seed spacing variability values. However, the most useful data to compare with the harvest field map will be planting seed spacing variability value data for a width of the planter matching a width of the harvesting machine since the harvest yield data is generated over the entire width of the harvesting machine. Given that harvester technology may change, any width of the planter, from a single row, multiple rows or the entire planter can be used to generate a planter field map. Thus, as used herein and in the following claims, "section composite seed spacing variability value" can be a selected single row, selected multiple rows or all rows of the planter.

While the processor 63 and memory 65 are shown and described above as being contained in the housing 61 of the monitor 60, the invention as claimed is not limited to this arrangement. The processor or memory can be located remote from the monitor. Furthermore, multiple processors and memory devices can be used and shall be included in the terms "processor" and "memory" as used herein and in the following claims.

Having described the preferred embodiment, it will become apparent that various modifications can be made without departing from the scope of the invention as defined in the accompanying claims.

What is claimed is:

1. A seeding apparatus comprising:
   a row unit having a seed meter adapted to sequentially discharge seeds and a seed sensor to generate a seed signal in response to a passing seed;
   a visual display; and
   a processor operably coupled to the seed sensor for receiving the generated seed signals, the processor configured to determine a numeric seed spacing variability value based on intervals between adjacent seeds, the processor further operably coupled to the visual display to display the seed spacing variability value in real time during operation of the apparatus.

2. The apparatus of claim 1 wherein the seed spacing variability value is determined based on time intervals between seed signals.

3. The apparatus of claim 1 wherein the seed spacing variability value is determined based on distance intervals between adjacent seeds based on location data associated with individual seed signals.

4. The apparatus of claim 1 wherein the processor is configured to collect seed signals for a sample period and then determine the seed spacing variability value for that sample period.

5. The apparatus of claim 4 further comprising:
   a receiver to collect location data for the apparatus; and
   a memory to store seed spacing variability values for multiple sample periods and the location data associated with each seed spacing variability value.

6. The apparatus of claim 1 wherein the seed spacing variability value is one of a standard deviation, a coefficient of variation, and a coefficient of uniformity.

7. A method of planting seeds using an apparatus having a row unit with a seed meter and a seed sensor, the method comprising:
   sequentially discharging seeds from the seed meter;
   sensing discharged seeds with the seed sensor and generating a seed signal in response to each seed;

processing the seed signals to determine a numeric seed spacing variability value based on time intervals between seed signals; and displaying to an operator the seed spacing variability value in real-time.

8. The method of claim 7 wherein the seed spacing variability value is one of standard deviation, coefficient of variation and coefficient of uniformity.

9. The method of claim 7 wherein seed signal data is collected for a sample period of time and processed to determine the seed spacing variability value for that sample period.

10. The method of claim 7 wherein the apparatus has a plurality of row units each having a seed meter and seed sensor the method comprising the step of processing of the seed signals to determine a seed spacing variability value for each row unit and displaying the seed spacing variability value for each row to the operator.

11. The method of claim 10 further comprising determining a planter composite seed spacing variability value by one of calculating an average of all the row seed spacing variability values and calculating a seed spacing variability value from the seed signals of all the row units.

12. The method of claim 9 further comprising determining a section composite seed spacing variability value for a selected set of row units of the apparatus by one of calculating an average of seed spacing variability values of the selected set of row units and calculating a seed spacing variability value from the seed signals of the selected set of row units.

13. The method of claim 12 further comprising the steps of:

storing in a memory the section composite seed spacing variability values for multiple sample periods;

storing location data associated with a location of the apparatus for each sample period; and generating a planting field map of the section composite seed spacing variability values.

14. The method of claim 13 further comprising the steps of:

harvesting the crop planted;

collecting and storing in a memory crop yield data for multiple locations in the field;

storing location data of the location in the field associated with the yield data;

generating a harvest field map of yield data; and comparing the planting field map of section composite seed spacing variability values with the harvest field map of yield data.

15. A seeding apparatus comprising:

a row unit having a seed meter adapted to sequentially discharge seeds and a seed sensor to generate a seed signal in response to a passing seed;

a visual display;

at least one processor operably coupled to the seed sensor for receiving the generated seed signals, the processor configured to determine a numeric seed spacing variability value the processor further operably coupled to the visual display to display the seed spacing variability value in real time during operation of the apparatus;

memory configured to store seed spacing variability value data collected over multiple rows of a field in which the seeding apparatus is planting seed and geographic location data which permits location of the seed spacing variability data in the field; and the at least one processor configured to access the stored seed spacing variability data and location data to effect a field map of the seed spacing variability data for multiple rows of the field over which the seeding apparatus has planted seed.

16. A seeding apparatus comprising:

a row unit having a seed meter adapted to sequentially discharge seeds and a seed sensor to generate a seed signal in response to a passing seed;

a visual display;

a processor operably coupled to the seed sensor to receive the generated seed signals, the processor configured to determine a numeric seed spacing variability value, the processor further operably coupled to the visual display to display the seed spacing variability value in real time during operation of the apparatus in a field, the seed spacing variability value comprising a unitless number selected from the group consisting of a standard deviation, coefficient variation, coefficient of uniformity, wherein the unitless number permits correlation of seed spacing and actual harvest data over the field to determine a desired seed spacing.

* * * * *